United States Patent [19]

Heeringa et al.

[11] Patent Number: 5,717,320
[45] Date of Patent: Feb. 10, 1998

[54] POWER SUPPLY CIRCUIT

[75] Inventors: Schelte Heeringa; Oedilius J. Bisschop, both of Drachten, Netherlands

[73] Assignee: U.S. Philips Corporation, New York, N.Y.

[21] Appl. No.: 754,359

[22] Filed: Nov. 22, 1996

[30] Foreign Application Priority Data

Nov. 27, 1995 [EP] European Pat. Off. .............. 95203248

[51] Int. Cl.$^6$ .................................................. G05F 1/56
[52] U.S. Cl. ................................. 323/282; 323/351
[58] Field of Search .......................... 323/222, 247, 323/271, 282, 284, 285, 328, 349, 351; 363/18, 19, 20, 21

[56] References Cited

U.S. PATENT DOCUMENTS

| | | | |
|---|---|---|---|
| 4,652,984 | 3/1987 | Van Der Akker et al. | 363/18 |
| 4,965,506 | 10/1990 | Algra et al. | 363/19 X |
| 4,969,077 | 11/1990 | Plagge | 363/19 X |
| 5,164,656 | 11/1992 | Gulczynski | 323/222 |
| 5,307,005 | 4/1994 | Ahladas et al. | 323/222 |

*Primary Examiner*—Peter S. Wong
*Assistant Examiner*—Y. J. Han
*Attorney, Agent, or Firm*—Ernestine C. Bartlett

[57] ABSTRACT

A buck converter comprises a load or a rechargeable battery (B), a self-inductance (L2), a diode (D2) and a switching transistor (T1). The current through the switching transistor (T1) is measured by means of a current sensor (Rs) which triggers a monostable multivibrator (MMV) when a given peak current is reached. The monostable multivibrator (MMV) turns off the switching transistor (T1) for a fixed time within which the current through the self-inductance (L2) is supplied to the load (B) via the diode (D2).

28 Claims, 5 Drawing Sheets

POWER SUPPLY CIRCUIT

The invention relates to a power-supply circuit for powering a load from an input voltage, comprising: a first terminal and a second terminal for receiving the input voltage; a switching transistor which, in series with a diode poled in the reverse direction, is connected between the first terminal and the second terminal; a self-inductance which, in series with the load to be powered, is connected across the diode; and a driver stage for turning on and turning off the switching transistor.

Figure 8:
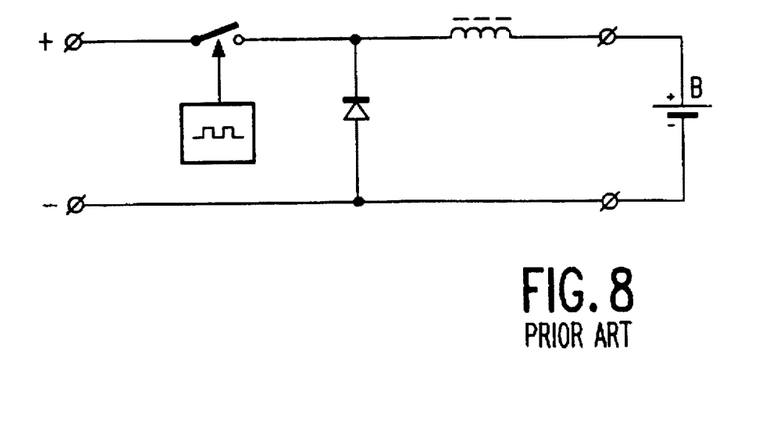
FIG. 8 shows a prior-art buck converter.

Such a power supply circuit is generally known and is also referred to as a buck converter. This known power supply circuit, of which the basic diagram is shown in FIG. 8, can be used for powering a load or for charging a rechargeable battery, for example a NiCd (Nickel-Cadmium) or NiMH (Nickel-Metal Hydride) battery. In electrical appliances, such as shavers, having rechargeable batteries which are charged from the mains, it is often desirable or required to charge the batteries with a current which is constant and mains-voltage independent. The known buck converter is generally used only if the difference between the input voltage and the output voltage is not too large. The reason for this is that in the case of a large voltage difference the duty cycle of the drive signal of the switching transistor is very small, which makes it difficult to control the output current or output voltage. A power supply circuit which is more suitable for this purpose is the self-oscillating power-supply circuit with a switching transistor in the primary winding of a transformer, whose secondary winding is connected to the load or the rechargeable battery via a rectifier diode. Such a self-oscillating power supply circuit is known, inter alia from U.S. Pat. No. 4,652,984. The transformer ensures a better adaptation to the low voltage of the load or battery. However, this self-oscillating power supply circuit requires the use of a transformer, a snubber across the primary winding to limit voltage transients across the switching transistor, and a secondary rectifier diode. Moreover, if no precautions are taken, the charging current of this power-supply circuit is dependent on the mains voltage, whose nominal value can vary between 100 and 250 V a.c.

It is an object of the invention to provide a comparatively simple transformerless power-supply circuit capable of supplying a substantially constant current over a large input voltage range. To this end, the power-supply circuit of the type defined in the opening paragraph is characterized in that the driver stage comprises means for turning off the switching transistor for a predetermined time interval when a predetermined peak current through the switching transistor is reached.

The driver stage ensures that the switching transistor remains conductive until the current through the self-inductance exceeds a given limit. At that instant the switching transistor is cut off for a predetermined time. The current through the self-inductance then flows to the load through the diode. The current through the load has a triangular waveform and the average current through the load is equal to half the peak current in the case that the current varies continuously. The peak current and hence the average current through the load is independent of the input voltage. The peak current is only reached more rapidly as the input voltage increases. The power supply does not require a snubber, because the diode and the load to be powered or the battery limit the voltage difference across the self-inductance when the switching transistor is cut off. As a result, no voltage transient is produced across the switching transistor, so that the voltage rating of this transistor can be lower. A further advantage of the power-supply circuit is that the power-supply circuit turns off itself in the case of an interrupted load or an interrupted rechargeable battery.

The means in the driver stage can be implemented by means of a current sensor and a microcontroller or microprocessor which receives the signals from the current sensor via suitable interface circuits and drives the switching transistor. A simple and effective implementation of the means is employed in an embodiment which is characterized in that the means comprise: a sensing resistor, arranged in series with the switching transistor, to generate a measurement signal in response to a current through the switching transistor; a monostable multivibrator having a trigger input for receiving the measurement signal and having an output coupled to the switching transistor in order to turn off the switching transistor for the predetermined time interval.

Monostable or one-shot multivibrators supply an output pulse of given duration after receipt of a trigger signal. This pulse can be applied with the correct polarity to the control electrode of the switching transistor, in order to turn off this transistor. An alternative to this turn-off is to arrange the output of the monostable multivibrator in series with the switching transistor. This is possible if this output can handle the full current through the switching transistor. The switching transistor is then driven on a main electrode instead of on the control electrode.

For the monostable multivibrator commercially available integrated circuits (ICs) can be used, such as HEF 4047, 74HC123, but also timers of the "555" type. Logic gate circuits and circuits of wholly discrete construction are also suitable for this purpose and have the advantage of a low current consumption.

A first variant, which comprises logic gate circuits and in which the control electrode of the switching transistor is driven, is characterized in that the sensing resistor is connected between a main electrode of the switching transistor and the second terminal; and the monostable multivibrator comprises: a first resistor and a first capacitor, arranged in series between a supply terminal and the second terminal; a further transistor having a control electrode coupled to the sensing resistor via a second resistor and having a main current path arranged in parallel with the first capacitor; a first inverter having an output and having an input for receiving a voltage across the first capacitor; a second inverter having an input coupled to the output of the first inverter and having an output for driving a control electrode of the switching transistor; a second capacitor connected between the output of the first inverter and the control electrode of the further transistor.

A second variant, which comprises logic gate circuits and in which a main electrode of the switching transistor is driven, is characterized in that the monostable multivibrator comprises: a first inverter having an output and having an input coupled to a main electrode of the switching transistor; a second inverter having output and having an input connected to the output of the first inverter via a capacitor; a resistor connected between the output and the input of the second inverter; a further transistor of a conductivity type opposite to the conductivity type of the switching transistor, which further transistor has a control electrode coupled to the output of the second inverter, and having a main electrode coupled to the main electrode of the switching transistor via the sensing resistor.

A third variant, which comprises a monostable multivibrator of wholly discrete construction and in which a main electrode of the switching transistor is driven, is characterized in that the monostable multivibrator comprises: a parallel arrangement of a further diode and a further resistor, which parallel arrangement has one terminal connected to the second terminal and has the other terminal coupled to a main electrode of the switching transistor via a capacitor; a further transistor having a first main electrode connected to the second terminal via the sensing resistor, having a second main electrode coupled to the main electrode of the switching transistor, and having a control electrode; yet another transistor having a control electrode connected to a tap of the further resistor, and having a main current path connected between the control electrode of the further transistor and the second terminal.

A fourth variant, which also comprises a monostable multivibrator of wholly discrete construction and in which a main electrode of the switching transistor is driven, is characterized in that the monostable multivibrator comprises: a further transistor of a conductivity type opposite to the conductivity type of the switching transistor, which further transistor has a control electrode, a first main electrode coupled to a main electrode of the switching transistor, and a second main electrode connected to the second terminal via the sensing resistor; yet another transistor of a conductivity type opposite to the conductivity type of the further transistor, which other transistor has a control electrode, a first main electrode connected to a tap of the sensing resistor, and a second main electrode coupled to the control electrode of the further transistor; a resistor connected between a supply terminal and the control electrode of the other transistor; a capacitor for coupling the control electrode of the other transistor to the sensing resistor; and a threshold element for limiting the voltage on the control electrode of the other transistor.

In this variant the one-shot time depends on the magnitude of the current through the switching transistor. Overshoot as a result of switching delays of the transistors are compensated automatically, so that no compensation is needed to maintain the output current constant.

The monostable multivibrator, whether in the form of an IC form or with logic circuits or discrete components, requires a constant supply voltage which is independent of the input voltage. Moreover, the control electrode of the switching transistor should be at a fixed voltage if a main electrode of the switching transistor is driven. A simple and effective solution for this is provided by an embodiment which is characterized in that the power-supply circuit further comprises: a zener diode and a supply resistor, arranged in series between the first terminal and the second terminal, for supplying a supply voltage which is stabilized with respect to the input voltage to the monostable multivibrator and/or the control electrode of the switching transistor.

If the power-supply circuit is used for charging a battery, it is useful to have a visual indication of the charging mode. To this end, an embodiment is characterized in that a light-emitting diode is arranged in series with the switching transistor. Since the peak current and the average current are known, the light-emitting diode can be arranged directly in the current circuit of the switching transistor.

These and other aspects of the invention will be described and elucidated with reference to the accompanying drawings, in which.

In these Figures like parts bear the same reference symbols.

Figure 1:
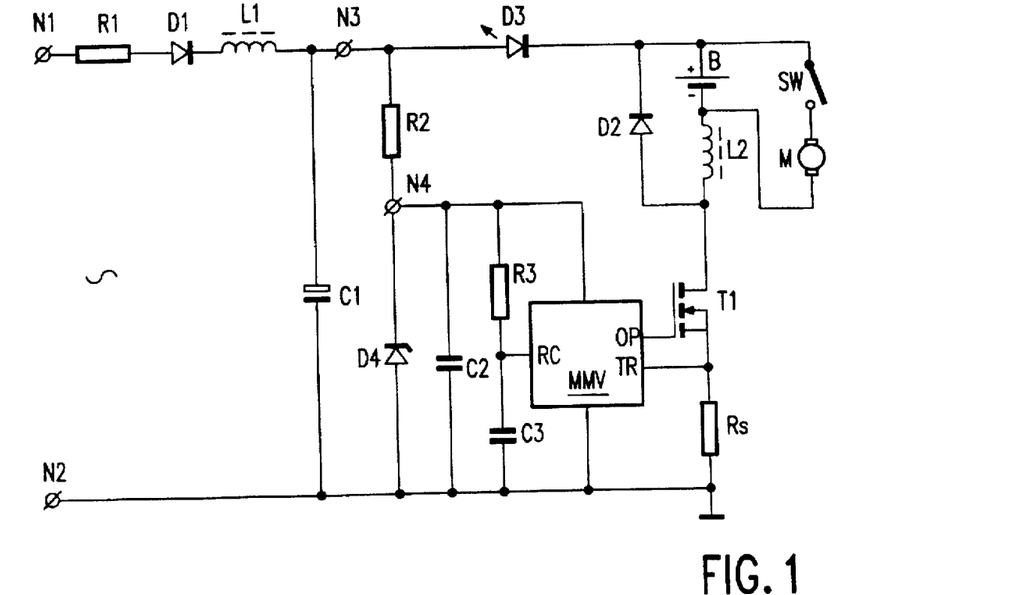
FIG. 1 shows an embodiment of a power-supply circuit in accordance with the invention.

FIG. 1 shows the circuit diagram of a power-supply circuit in accordance with the invention. The a.c. mains voltage is applied to the terminals N1 and N2, of which the terminal N2 forms the signal ground. The a.c. mains voltage is rectified by means of a rectifier diode D1 which, in series with a resistor R1 and a filter coil L1, is connected between the terminal N1 and a positive supply terminal N3. The rectified voltage on the positive supply terminal N3 is smoothed by means of a capacitor C1 connected between the terminals N3 and N2. Also arranged in series between the terminals N3 and N2 are: a light-emitting diode (LED) D3, a load B, a self-inductance L2, a switching transistor T1 and a sensing resistor Rs. The LED D3 is optional and may be dispensed with. The load is, by way of example, a rechargeable battery B, but any other load is possible, for example a resistor in parallel with a capacitor. The switching transistor T1 is a unipolar MOS transistor but likewise a bipolar transistor may be used for this purpose. A diode D2 is connected in parallel with the series arrangement of the self-inductance L2 and the battery B and is cut off when the switching transistor T1 conducts. The control electrode or gate of the switching transistor T1 is connected to an output OP of a monostable multivibrator MMV, which has its trigger input TR connected to the sensing resistor Rs. The signal voltage on the output OP of the monostable multivibrator MMV becomes low (ground potential) for a predetermined one-shot time if the voltage on the trigger input TR exceeds a given value. The one-shot time is determined by a capacitor C3 and a resistor R3, which are connected to a timing input RC. The monostable multivibrator MMV receives supply voltage from a positive supply terminal N4, which is connected to the positive supply terminal N3 via a supply resistor R2 and to ground via a zener diode D4 and a capacitor C2. In practice, the manner in which the time-determining resistor R3 and capacitor C3 are arranged may differ from that shown in FIG. 1, the resistor R3 being connected to the positive supply terminal N4 and the capacitor C3 to ground. Suitable ready-made monostable multivibrators are for example HEF 4047 and 74HC123, but it is also possible to use timers of the type 555. The battery B and the power-supply circuit may, for example, be incorporated in a shaver whose motor M is connected to the battery B via a switch SW.

The output OP of the monostable multivibrator MMV is normally high and turns on the switching transistor T1. This results in a linearly increasing current through the battery B, the self-inductance L2, the switching transistor T1 and the sensing resistor Rs, the diode D2 being cut off. The current increases until the voltage across the sensing resistor reaches the trigger level of the trigger input TR. At this instant the output OP goes low and the switching transistor T1 is turned off for the one-shot time. The current through the self-inductance L2 now continues its way through the diode D2, which now conducts, and decreases linearly to zero. After expiry of the one-shot time the output OP becomes relatively high and the switching transistor T1 is turned on again. The current through the load has a triangular waveform, the average value of the current being equal to half the peak value of the current, at least when the current is continuous. In the case of a longer one-shot time the triangles are not contiguous and the average value of the current is smaller. The peak value is determined by the value of the sensing resistor Rs and the trigger level of the trigger input TR. The magnitude of the rectified supply voltage on the terminal N3 does not play a part in this respect. The average current through the battery B is therefore substantially independent of the mains voltage. The pulsating current through the switching transistor causes the LED D3 to light up as an indication that the battery B is being charged. The coil L1 reduces switching transients produced by the switching transistor T1 and the resistor R1 limits inrush currents. If the power consumed from the mains is low, half-wave rectification can be used. For higher power levels a bridge rectifier can be employed. The operation of the power-supply circuit is based on the principle of the buck converter shown in FIG. 8. The power-supply circuit is self-oscillating and can charge the battery B with an average current which is substantially independent of the mains voltage.

Figure 2:
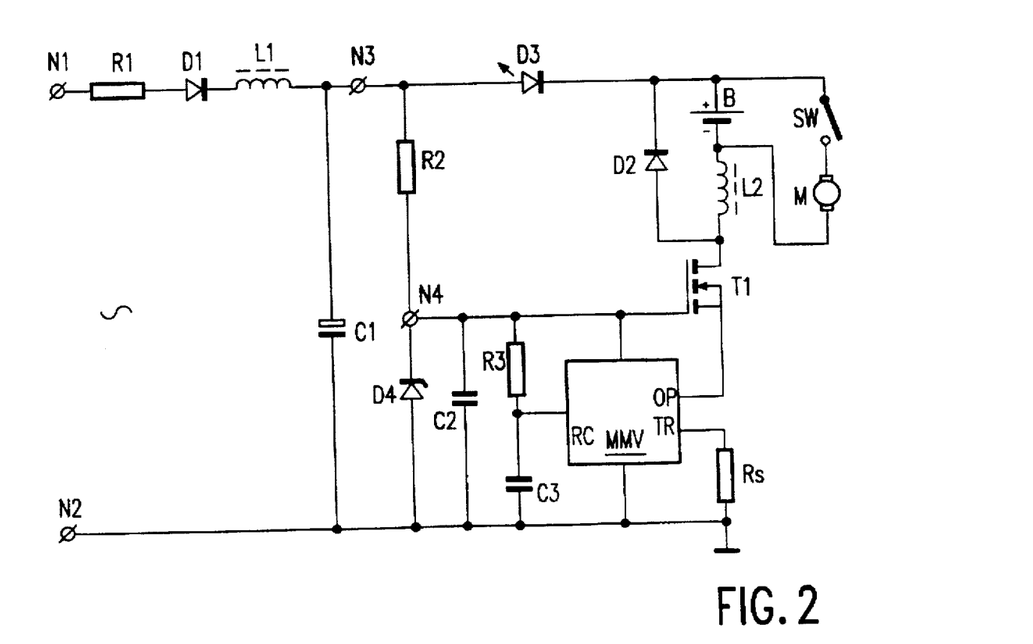
FIG. 2 shows an embodiment of a power-supply circuit in accordance with the invention.

FIG. 2 shows a variant of the power-supply circuit of FIG. 1. The gate of the switching transistor T1 is connected to the positive supply terminal N4 and the output OP of the monostable multivibrator MMV is connected in series with the source of the switching transistor T1. The switching transistor T1 is now turned off by interrupting the source current. The signal voltage on the output OP is the inverse of the signal voltage in the variant shown in FIG. 1 and is therefore comparatively high during the one-shot time. In this variant the output OP carries the full current through the switching transistor T1.

Figure 3:
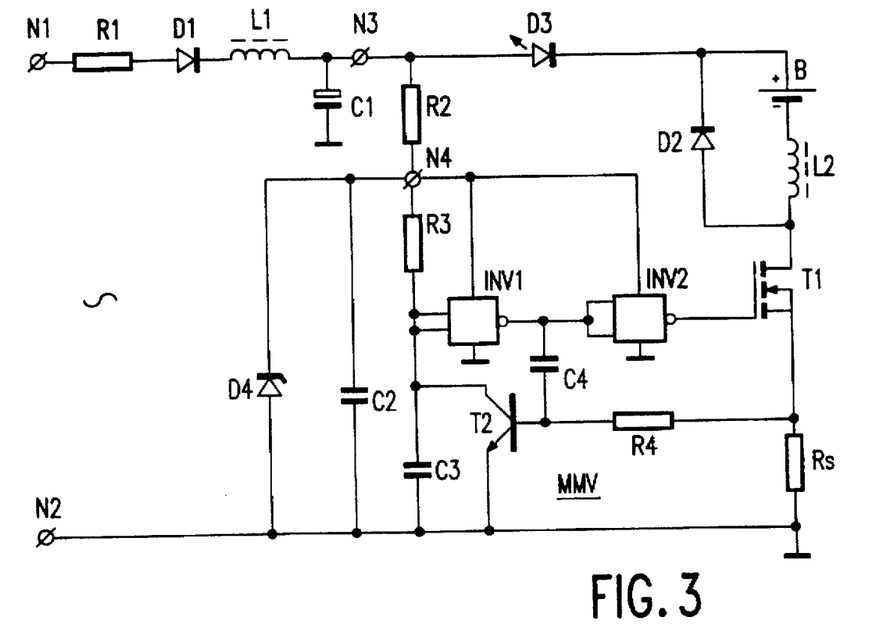
FIG. 3 shows an embodiment of a power-supply circuit in accordance with the invention.

FIG. 3 shows an embodiment comprising a monostable multivibrator implemented by means of logic gates. The use of CMOS gates is preferred in view of the low current consumption. The supply resistor R2 can then have a comparatively large resistance value, which reduces the dissipation. The sensing resistor Rs is connected between the source of the switching transistor T1 and ground. The monostable multivibrator MMV comprises a timing resistor R3 and a timing capacitor C3, which are arranged in series between the positive supply terminal N4 and ground. The multivibrator further comprises an NPN transistor T2 having its base coupled to the sensing resistor Rs via a resistor R4 and having its collector-emitter path arranged in parallel with the capacitor C3. The monostable multivibrator MMV further comprises a first inverter INV1, whose input is connected to the node between the resistor R3 and the capacitor C3, and a second inverter INV2, whose input is coupled to the output of the first inverter INV1 and whose output drives the gate of the switching transistor T1. A capacitor C4 is connected between the output of the first inverter INV1 and the base of the NPN transistor T2.

The transistor T2 discharges the timing capacitor C3 if the voltage across the sensing resistor Rs becomes higher than approximately 0.6 V. The capacitor C4 provides positive feedback, as a result of which the transistor T2 is turned on more rapidly. The output of the inverter INV1 goes high and the output of the inverter INV2 goes low, causing the switching transistor T1 to be turned off. This situation persists until the voltage across the capacitor C3 has reached the change-over voltage of the inverter INV1. Since the change-over voltage of a CMOS gate has a substantial tolerance, the monostable multivibrator MMV is triggered by a bipolar transistor instead of by a third CMOS gate, so that the peak current is well defined. If desired, a MOS transistor may be used for the transistor T2 instead of a bipolar transistor.

Figure 4:
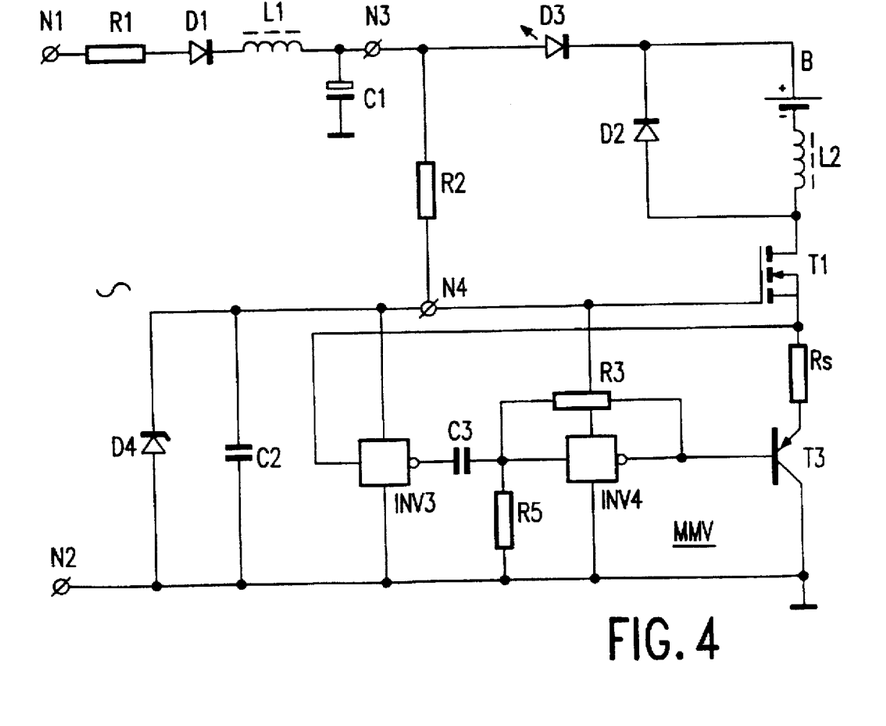
FIG. 4 shows an embodiment of a power-supply circuit in accordance with the invention.

FIG. 4 shows a variant in which the drive signal is applied to the source of the switching transistor T1. The switching transistor T1 has its gate connected to the positive supply terminal N4. The monostable multivibrator MMV comprises an inverter INV3 having an input coupled to the source of the switching transistor T1, an inverter INV4 having its input connected to the output of the inverter INV3 via a timing capacitor C3, a timing resistor R3 connected between the output and the input of the inverter INV4, and a PNP transistor T3 having its base coupled to the output of the inverter INV4, having its collector coupled to ground, and having its emitter coupled to the source of the switching transistor T1 via the sensing resistor Rs.

In this variant both the turn-off level and the one-shot time are determined by the change-over voltage of the inverters INV3 and INV4. In the case of a high change-over voltage of the inverter INV3 the peak current becomes larger but the one-shot time of the other inverter INV4 also increases. These effects compensate for one another, so that the charging current remains substantially constant. The compensation can be optimized by including a resistor R5 between the input of the inverter INV4 and earth. The timing resistor R3 is connected to the output of the inverter INV4 instead of to the positive supply terminal N4, in order to ensure that the circuit always starts to oscillate. If the switching transistor T1 conducts the output of the inverter INV3 is low and the timing capacitor C3 is discharged through the protective diode of the inverter INV3, which is incorporated in CMOS gates. This can also be achieved by means of a separate diode poled in the reverse direction between the input of the inverter INV4 and ground.

Figure 5:
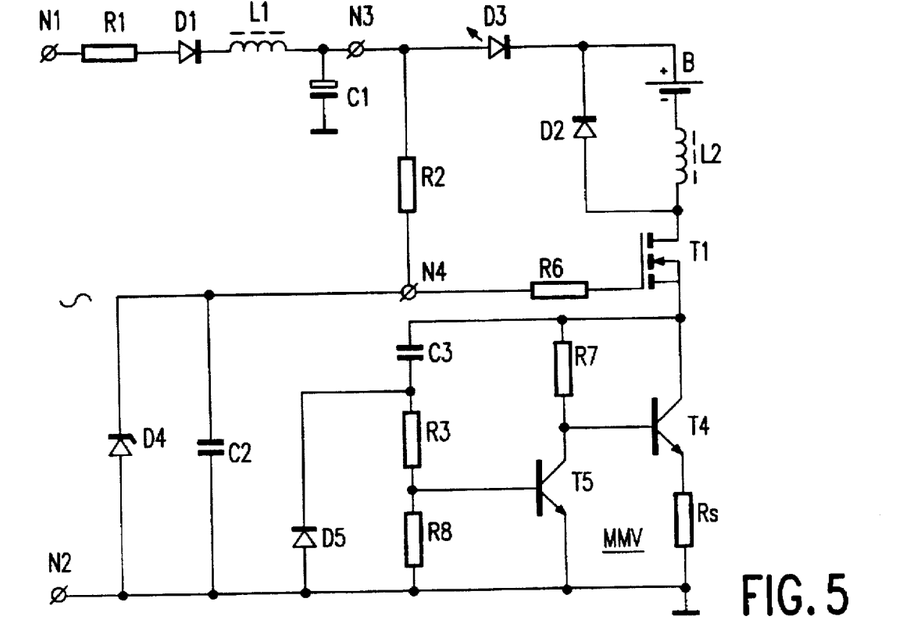
FIG. 5 shows an embodiment of a power-supply circuit in accordance with the invention.

FIG. 5 shows an embodiment comprising a monostable multivibrator MMV wholly constructed by means of discrete components. The switching transistor T1 has its gate connected to the positive supply terminal N4 via a resistor R6 in order to suppress possible turn-off transients of the switching transistor T1. The timing capacitor C3 is connected between the source of the switching transistor T1 and a node which is grounded via a parallel arrangement of a diode D5 and the timing resistor R3 and a resistor R8 arranged in series therewith. An NPN transistor T5 has its base connected to the node between the resistors R3 and R8 and has its emitter connected to ground. The collector of the transistor T5 is connected to the source of the switching transistor T1 via a resistor R7. Moreover, an NPN transistor T4 has its emitter connected to ground via the sensing resistor Rs and has its base and its collector connected to the collector of the transistor T5 and the source of the switching transistor T1, respectively.

The one-shot time is determined by the resistor R3 and the capacitor C3. While the capacitor C3 is being charged the switching transistor T1 operates as a source follower for the fixed voltage on the positive supply terminal N4. When the capacitor C3 has reached its full charge the current through the resistor R3 becomes so small that the transistor T5 is turned off. The transistor T4 can now receive base current via the resistor R7 and is turned on. The transistor T4 pulls the source of the switching transistor T1 to ground via the sensing resistor Rs, as a result of which the switching transistor T1 is turned on. Moreover, the capacitor C3 discharges via the diode D5. The voltage across the capacitor C3 will hardly change during conduction of the switching transistor T1. The voltage across the resistors R3 and R8 now follows the sum of the voltage across the sensing resistor Rs and the collector-emitter voltage of the transistor T4. The increasing voltage across the resistor R8 turns on the transistor T5, which in its turn turns off the transistor T4. As a result of this, the voltage across the transistor T4 increases. This increase causes the voltage across the resistor R8 to increase, as a result of which the transistor T5 is drive further into conduction. This positive feedback ensures that the transistor T4 and, consequently, the switching transistor T1 are turned off very rapidly. Alternatively, the transistors T4 and T5 may be MOS transistors.

Figure 6:
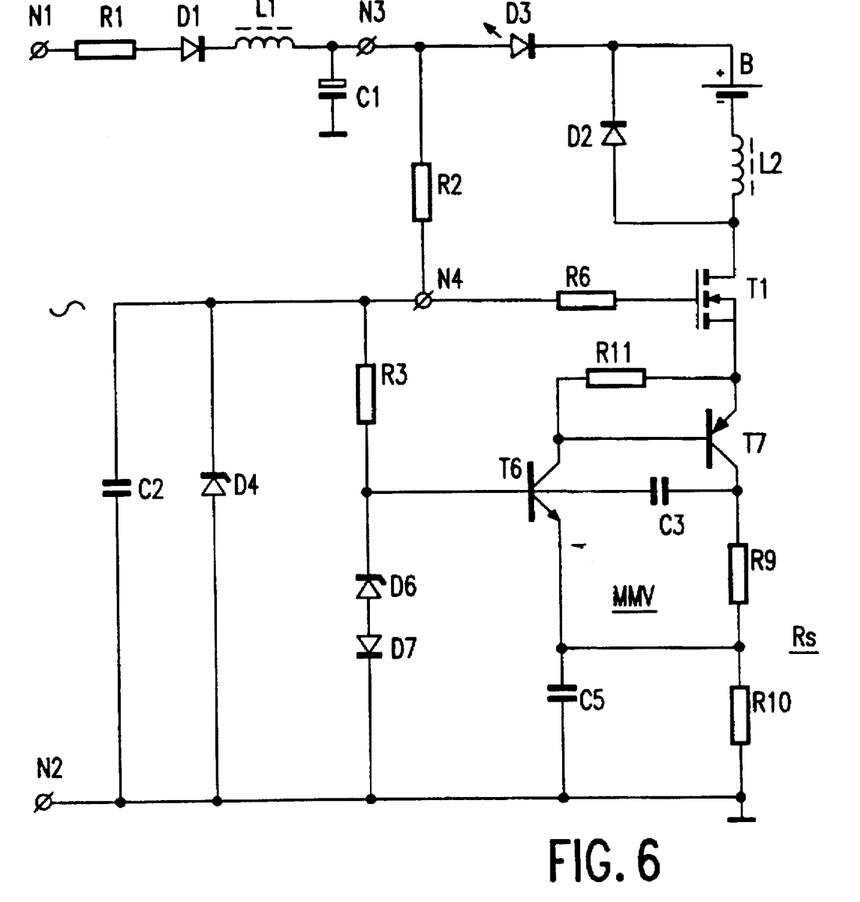
FIG. 6 shows an embodiment of a power-supply circuit in accordance with the invention.

FIG. 6 shows another embodiment using a discrete monostable multivibrator MMV. Again, the switching transistor T1 has its gate connected to the positive supply terminal N4 via a resistor R6 in order to suppress possible turn-off transients of the switching transistor T1. The source of the switching transistor T1 is connected to the emitter of a PNP transistor T7, whose collector is connected to ground via the sensing resistor Rs. The sensing resistor Rs is split into two resistors R9 and R10, the resistor R9 being connected to the collector of the transistor T7 and the resistor R10 being connected to ground. The resistors R9 and R10 are interconnected in a tap. This tap is connected to the emitter of an NPN transistor T6, whose collector is connected to the base of the transistor T7. The timing resistor R3 is connected between the positive supply terminal N4 and the base of the transistor T6. The timing capacitor C3 is connected between the base of the transistor T6 and the node between the sensing resistor Rs and the collector of the transistor T7. A threshold element, in the present case a zener diode D6, and an optional diode D7 are arranged in series between the base of the transistor T6 and ground. The zener diode D6 breaks down if the voltage on the base of the transistor T6 exceeds a certain threshold and then forms a low-impedance path to ground via the optional diode D7. An optional resistor R11 may be connected in parallel with the base-emitter junction of the transistor T7. Moreover, an optional capacitor C5 may be connected in parallel with the resistor R10.

The transistor T6 is turned on as soon as the timing capacitor C3 has been charged positively to approximately +0.6 V via the timing resistor R3. The transistor T6 then turns on the transistor T7 and the switching transistor T1. The increasing current through the switching transistor T1 and the transistor T7 produces an increasing voltage across the resistor R9, which is fed back to the base of the transistor T6 via the timing capacitor C3. The timing capacitor C3 provides positive feedback in that a current to the base of the transistor T6 is obtained via the timing capacitor C3. This results in a negative charge on the timing capacitor C3. The transistor T6 remains in its on-state until the voltage across the resistor R10 becomes equal to the zener voltage of the zener diode D6. From this instant the current through the timing capacitor C3 flows via the zener diode D6 instead of to the base of the transistor T6. The transistor T6 and, as a consequence, the transistor T7 and the switching transistor T1, will then be cut off. When the switching transistor T1 is cut off the voltage across the resistors R9 and R10 ceases. Owing to the negative charge of the timing capacitor C3 the transistors T6 and T7 and, consequently, the switching transistor T1 remain non-conductive until the timing capacitor C3 has been charged positively via the timing resistor R3.

Owing to the presence of the resistor R9 the one-shot time of the monostable multivibrator MMV is dependent on the magnitude of the peak current through the series arrangement between the positive supply terminal N3 and ground.

Possible overshoot as a result of the switching delay in the transistors T6 and T7 and in the switching transistor T1, for example due to a larger mains voltage, is compensated automatically and the average current through the battery B remains constant.

The diode D7 prevents the zener diode D6 from being turned on when the voltage across the timing capacitor C3 becomes negative. If the diode D7 is not used the one-shot time becomes fixed and is no longer dependent on the peak current. The timing capacitor C3 and the resistor R9 can be dimensioned in such a manner that the negative voltage across the timing capacitor C3 never becomes larger than 0.6 V. In that case the diode D7 may be dispensed with.

The capacitor C5 suppresses voltage transients produced across the resistor R10 when the switching transistor T1 is turned on, which transients are produced by current surges caused by discharging of possible parasitic capacitances of the self-inductance L2. Otherwise, the transistor T6 would immediately be turned off again by these voltage transients. The resistor R11 contributes to a more accurately defined turn-on instant of the transistor T7. The collector current of the transistor T6 should first build up a threshold voltage across the resistor R11 before the transistor T7 is turned on. If desired, the transistors T6 and T7 may be MOS transistors.

Figure 7:
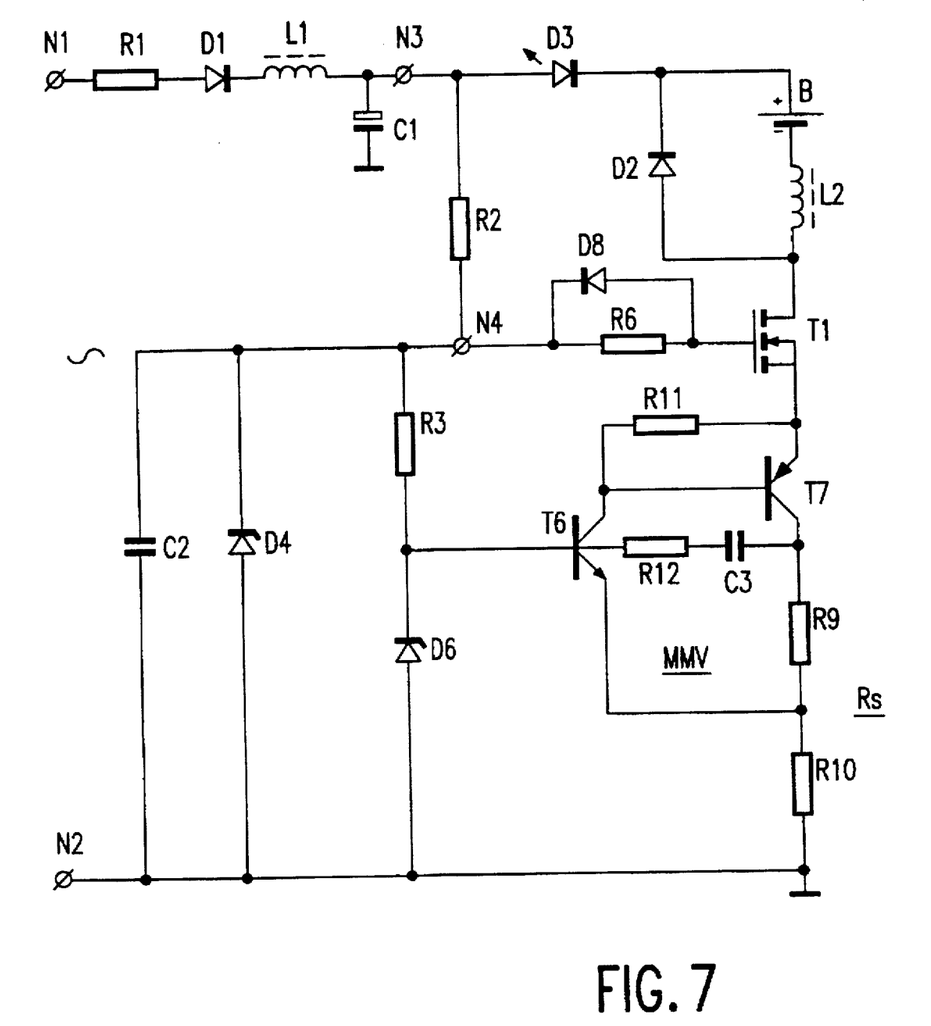
FIG. 7 shows an embodiment of a power supply circuit in accordance with the invention.

FIG. 7 shows an embodiment which is basically the same as the embodiment of FIG. 6. The optional diode D7 and the optional capacitor C5 have been omitted. A diode D8 is connected in parallel to the resistor R6 and a resistor R12 is connected between the base of transistor T6 and the timing capacitor C3. The aforementioned transients caused by discharging of parasitic capacitances of the self-inductance L2 are now suppressed by the time constant of resistor R6 and the gate-capacitance of the switching transistor T1. For this purpose the resistance of resistor R6 should be rather high. The switching transistor T1 will turn on slowly and causes a slow voltage increase over the self-inductance L2 and over the parasitic capacitances of the self-inductance L2. As a consequence no large current peaks flow through resistor R10 during the turn-on of transistor T1. Diode D6 ensures a fast turn-off of the switching transistor T1 and further limits the gate voltage of the switching transistor T1 during turn-off. Resistor R12 enables the adjustment of the afore-mentioned compensation for overshoot due to variations of the mains voltage. A greater resistance of resistor R12 causes a smaller compensation. In this way the degree of compensation can be optimised for the entire range of mains voltages by means of a suitable selection or adjustment of the resistance of resistor R12.

Figure 9:
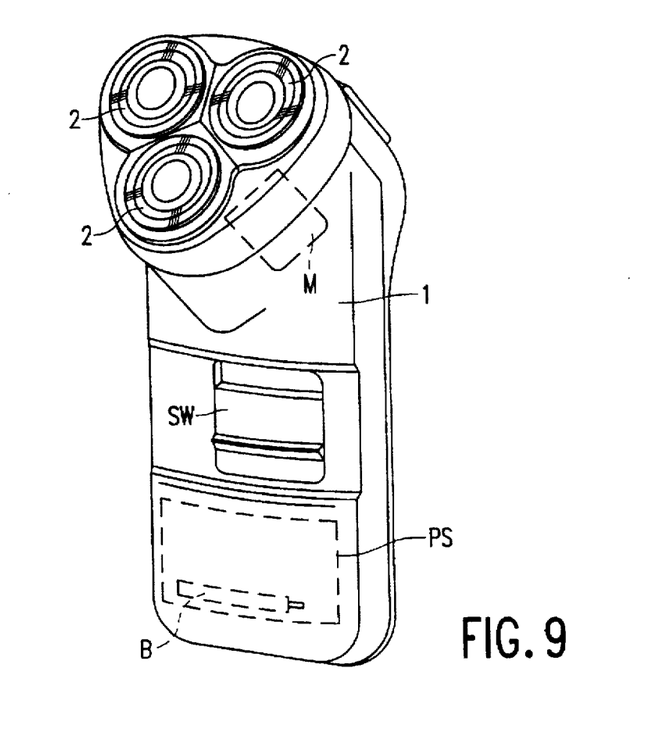
FIG. 9 shows an electric shaver comprising a rechargeable battery and a power-supply circuit in accordance with the invention.

The power-supply circuit is suitable for electrical appliances with rechargeable batteries, for example NiCd or NiMH batteries, which are charged from the mains voltage. FIG. 9 shows an electric shaver having a housing 1, which accommodates the power-supply circuit PS, the rechargeable battery B and the motor M. The motor drives the shaver heads 2 and is actuated by means of the switch SW.

We claim:

1. A power-supply circuit for powering a load (B) from an input voltage, comprising: a first terminal (N3) and a second terminal (N2) for receiving the input voltage; a switching transistor (T1) which, in series with a diode (D2) poled in the reverse direction, is connected between the first terminal (N3) and the second terminal (N2); a self-inductance (L2) which, in series with the load (B) to be powered, is connected across the diode (D2); and a driver stage for turning on and turning off the switching transistor (T1), characterized in that the driver stage comprises means (MMV) for turning off the switching transistor (T1) for a predetermined

9 time interval when a predetermined peak current through the switching transistor (T1) is reached.

2. A power-supply circuit as claimed in claim 1, characterized in that the means comprise: a sensing resistor (Rs), arranged in series with the switching transistor (T1), to generate a measurement signal in response to a current through the switching transistor (T1); a monostable multivibrator (MMV) having a trigger input (TR) for receiving the measurement signal and having an output (OP) coupled to the switching transistor (T1) in order to turn off the switching transistor (T1) for the predetermined time interval.

3. A power-supply circuit as claimed in claim 2, characterized in that the sensing resistor (Rs) is connected between a main electrode of the switching transistor (T1) and the second terminal (N2); and the monostable multivibrator (MMV) comprises: a first resistor (R3) and a first capacitor (C3), arranged in series between a supply terminal (N4) and the second terminal (N2); a further transistor (T2) having a control electrode coupled to the sensing resistor (Rs) via a second resistor (R4) and having a main current path arranged in parallel with the first capacitor (C3); a first inverter (INV1) having an output and having an input for receiving a voltage across the first capacitor (C3); a second inverter (INV2) having an input coupled to the output of the first inverter (INV1) and having an output for driving a control electrode of the switching transistor (T1); a second capacitor (C4) connected between the output of the first inverter (INV1) and the control electrode of the further transistor (T2).

4. A power-supply circuit as claimed in claim 2, characterized in that the monostable multivibrator (MMV) comprises: a first inverter (INV3) having an output and having an input coupled to a main electrode of the switching transistor (T1); a second inverter (INV4) having output and having an input connected to the output of the first inverter (INV3) via a capacitor (C3); a resistor (R3) connected between the output and the input of the second inverter (INV4); a further transistor (T3) of a conductivity type opposite to the conductivity type of the switching transistor (T1), which further transistor has a control electrode coupled to the output of the second inverter (INV4), and having a main electrode coupled to the main electrode of the switching transistor (T1) via the sensing resistor (Rs).

5. A power-supply circuit as claimed in claim 2, characterized in that the monostable multivibrator (MMV) comprises: a parallel arrangement of a further diode (DS) and a further resistor (R3/R8), which parallel arrangement has one terminal connected to the second terminal (N2) and has the other terminal coupled to a main electrode of the switching transistor (T1) via a capacitor (C3); a further transistor (T4) having a first main electrode connected to the second terminal (N2) via the sensing resistor (Rs), having a second main electrode coupled to the main electrode of the switching transistor (T1), and having a control electrode; yet another transistor (T5) having a control electrode connected to a tap of the further resistor (R3/R8), and having a main current path connected between the control electrode of the further transistor (T4) and the second terminal (N2).

6. A power-supply circuit as claimed in claim 2, characterized in that the monostable multivibrator (MMV) comprises: a further transistor (T7) of a conductivity type opposite to the conductivity type of the switching transistor (T1), which further transistor has a control electrode, a first main electrode coupled to a main electrode of the switching transistor (T1), and a second main electrode connected to the second terminal (N2) via the sensing resistor (Rs); yet

10 another transistor (T6) of a conductivity type opposite to the conductivity type of the further transistor (T7), which other transistor (T6) has a control electrode, a first main electrode connected to a tap (R9/R10) of the sensing resistor (Rs), and a second main electrode coupled to the control electrode of the further transistor (T7); a resistor (R3) connected between a supply terminal (N4) and the control electrode of the other transistor (T6); a capacitor (C3) for coupling the control electrode of the other transistor (T6) to the sensing resistor (Rs); and a threshold element (D6) for limiting the voltage on the control electrode of the other transistor (T6).

7. A power-supply circuit as claimed in claim 6, characterized in that the monostable multivibrator (MMV) further comprises: a further diode (D7) arranged in series with the threshold element (D6) and conductive in the case of limiting by the threshold element (D6).

8. A power-supply circuit as claimed in claim 7, wherein the monostable multivibrator (MMV) further comprises:

a further capacitor (C5) connected between the tap (R9/R10) of the sensing resistor (Rs) and the second terminal (N2).

9. A power-supply as claimed in claim 7, wherein the monostable multivibrator (MMV) further comprises:

a resistor (R12) connected in series with the capacitor (C3).

10. A power-supply as claimed in claim 7, wherein the power-supply circuit further comprises:

a resistor (R6) and a diode (D8) connected in parallel between the supply terminal (N4) and a control electrode of the switching transistor (T1).

11. A power-supply circuit as claimed in claim 7, wherein the power-supply circuit further comprises: a zener diode (D4) and a supply resistor (R2), arranged in series between the first terminal (N3) and the second terminal (N2), for supplying a supply voltage which is stabilized with respect to the input voltage to the monostable multivibrator (MMV) and/or the control electrode of the switching transistor (T1).

12. A power-supply circuit as claimed in claim 7, wherein a light-emitting diode is arranged in series with the switching transistor (T1).

13. A power-supply circuit as claimed in claim 6 wherein the monostable multivibrator (MMV) further comprises:

a further capacitor (C5) connected between the tap (R9/R10) of the sensing resistor (Rs) and the second terminal (N2).

14. A power-supply as claimed in claim 13, wherein the monostable multivibrator (MMV) further comprises:

a resistor (R12) connected in series with the capacitor (C3).

15. A power-supply as claimed in claim 13, wherein the power-supply circuit further comprises:

a resistor (R6) and a diode (D8) connected in parallel between the supply terminal (N4) and a control electrode of the switching transistor (T1).

16. A power-supply circuit as claimed in claim 13, wherein the power-supply circuit further comprises: a zener diode (D4) and a supply resistor (R2), arranged in series between the first terminal (N3) and the second terminal (N2), for supplying a supply voltage which is stabilized with respect to the input voltage to the monostable multivibrator (MMV) and/or the control electrode of the switching transistor (T1).

17. A power-supply circuit as claimed in claim 13, wherein a light-emitting diode is arranged in series with the switching transistor (T1).

18. A power supply as claimed in claim 6, wherein the monostable multivibrator (MMV) further comprises:

a resistor (R12) connected in series with the capacitor (C3).

19. A power-supply as claimed in claim 18, wherein the power-supply circuit further comprises:

a resistor (R6) and a diode (D8) connected in parallel between the supply terminal (N4) and a control electrode of the switching transistor (T1).

20. A power-supply circuit as claimed in claim 18, wherein the power-supply circuit further comprises: a zener diode (D4) and a supply resistor (R2), arranged in series between the first terminal (N3) and the second terminal (N2), for supplying a supply voltage which is stabilized with respect to the input voltage to the monostable multivibrator (MMV) and/or the control electrode of the switching transistor (T1).

21. A power-supply circuit as claimed in claim 18, wherein a light-emitting diode is arranged in series with the switching transistor (T1).

22. A power supply as claimed in claim 6, wherein the power-supply circuit further comprises:

a resistor (R6) and a diode (D8) connected in parallel between the supply terminal (N4) and control electrode of the switching transistor (T1).

23. A power-supply circuit as claimed in claim 22, wherein the power-supply circuit further comprises: a zener diode (D4) and a supply resistor (R2), arranged in series between the first terminal (N3) and the second terminal (N2), for supplying a supply voltage which is stabilized with respect to the input voltage to the monostable multivibrator (MMV) and/or the control electrode of the switching transistor (T1).

24. A power-supply circuit as claimed in claim 22, wherein a light-emitting diode is arranged in series with the switching transistor (T1).

25. A power-supply circuit as claimed in claim 2, wherein characterized in that the power-supply circuit further comprises: a zener diode (D4) and a supply resistor (R2), arranged in series between the first terminal (N3) and the second terminal (N2), for supplying a supply voltage which is stabilized with respect to the input voltage to the monostable multivibrator (MMV) and/or the control electrode of the switching transistor (T1).

26. A power-supply circuit as claimed in claim 25, wherein a light-emitting diode is arranged in series with the switching transistor (T1).

27. A power-supply circuit as claimed in claim 2, wherein a light-emitting diode is arranged in series with the switching transistor (T1).

28. An electric shaver comprising: a rechargeable battery (B), an electric motor (M), a switch (SW) for connecting the motor (M) to the battery (B), and a power-supply circuit (PS) as claimed in claim 1, for powering the battery (B) and/or the motor (M).

* * * * *